United States Patent
Shetty et al.

(10) Patent No.: US 11,025,773 B1
(45) Date of Patent: Jun. 1, 2021

(54) VIRTUAL COMMUNICATION SERVICE FOR MOBILE DEVICES

(71) Applicant: West Corporation, Omaha, NE (US)

(72) Inventors: Santhosh Monappa Shetty, Omaha, NE (US); Manish Reddy Bendhi, Omaha, NV (US)

(73) Assignee: INTRADO CORPORATION, Omaha, NE (US)

( * ) Notice: Subject to any disclaimer, the term of this patent is extended or adjusted under 35 U.S.C. 154(b) by 0 days.

(21) Appl. No.: 16/545,969

(22) Filed: Aug. 20, 2019

(51) Int. Cl.
- *H04M 3/22* (2006.01)
- *H04W 76/10* (2018.01)
- *G06F 9/455* (2018.01)

(52) U.S. Cl.
CPC ...... *H04M 3/2218* (2013.01); *G06F 9/45558* (2013.01); *H04W 76/10* (2018.02); *G06F 2009/45562* (2013.01); *G06F 2009/45575* (2013.01)

(58) Field of Classification Search
None
See application file for complete search history.

(56) References Cited

U.S. PATENT DOCUMENTS

| | | | |
|---|---|---|---|
| 2011/0028133 A1* | 2/2011 | Roach, Jr. | H04M 3/42382 455/414.2 |
| 2012/0028618 A1* | 2/2012 | Goel | H04W 36/385 455/414.1 |
| 2012/0094642 A1* | 4/2012 | Popperl | H04W 4/14 455/415 |
| 2017/0168862 A1* | 6/2017 | Yocam | G06F 9/45558 |
| 2017/0237860 A1* | 8/2017 | Mumick | H04L 67/306 455/417 |
| 2018/0183920 A1* | 6/2018 | Celik | H04W 4/12 |

* cited by examiner

*Primary Examiner* — Antim G Shah

(57) ABSTRACT

One example method of operation may include identifying a failed call connection via a notification identifying a calling device and a called device stored in a carrier network, and responsive to identifying the notification, transmitting an invocation request to a virtual computing network comprising a plurality of virtual machines, selecting a virtual machine corresponding to the called device, selecting a virtual mobile device from among a plurality of virtual mobile devices operating on the virtual machine, initiating a virtual mobile device application associated with the virtual mobile device, and responsive to initiating the virtual mobile device application, transmitting one or more of a first message to the called device and a second message to the calling device.

14 Claims, 10 Drawing Sheets

VIRTUAL COMMUNICATION SERVICE FOR MOBILE DEVICES

TECHNICAL FIELD OF THE APPLICATION

This application relates to providing an alternative communication platform for mobile device, and more specifically to a virtual communication service for mobile devices.

BACKGROUND OF THE APPLICATION

Conventionally, mobile devices operate on mobile device carrier networks which provide cellular and/or data services to mobile devices which can communicate with the carrier networks. When a mobile device is outside of its carrier network communication range, the device may appear out of service and may not provide call, text, data messaging, GPS, and other services which are commonly available when the mobile device is operational and in communication with a service providing network. Mobile devices are computers which can communicate with other data networks, such as WIFI hotspots and other data networks other than just a more commonly relied upon carrier network. Advanced software tools, such as DOCKER 'CONTAINERS' or virtual machines may be setup in advance to process missed calls and alternative communication strategies via call management applications.

SUMMARY OF THE APPLICATION

Example embodiments of the present application provide at least a method that includes one or more of identifying a call communication intended for a called device, determining the call communication resulted in a failed call connection, responsive to identifying the failed call connection, invoking a virtual mobile device application operating on a virtual machine, executing a master file stored in the virtual machine, and responsive to executing the master file, transmitting a communication message to the called device.

Another example embodiment may include an apparatus that includes a processor configured to identify a call communication intended for a called device, determine the call communication resulted in a failed call connection, responsive to the failed call connection, invoke a virtual mobile device application operating on a virtual machine, execute a master file stored in the virtual machine, and a transmitter configured to transmit a communication message to the called device responsive to execution of the master file.

Still another example embodiment may include a non-transitory computer readable storage medium configured to store instructions that when executed cause a processor to perform identifying a call communication intended for a called device, determining the call communication resulted in a failed call connection, responsive to identifying the failed call connection, invoking a virtual mobile device application operating on a virtual machine, executing a master file stored in the virtual machine, and responsive to executing the master file, transmitting a communication message to the called device.

Yet another example embodiment may include a method configured to perform one or more of identifying a failed call connection via a notification identifying a calling device and a called device stored in a carrier network, and responsive to identifying the notification, transmitting an invocation request to a virtual computing network comprising a plurality of virtual machines, selecting a virtual machine corresponding to the called device, selecting a virtual mobile device from among a plurality of virtual mobile devices operating on the virtual machine, initiating a virtual mobile device application associated with the virtual mobile device, and responsive to initiating the virtual mobile device application, transmitting one or more of a first message to the called device and a second message to the calling device.

Yet another example embodiment may include an apparatus having a processor configured to perform one or more of identify a failed call connection via a notification identifying a calling device and a called device stored in a carrier network, and a transmitter configured to, responsive to the notification being identified, transmit an invocation request to a virtual computing network comprising a plurality of virtual machines, and the processor is further configured to select a virtual machine corresponding to the called device, select a virtual mobile device from among a plurality of virtual mobile devices operating on the virtual machine, initiate a virtual mobile device application associated with the virtual mobile device, and responsive to the virtual mobile device application being initiated, the transmitter is further configured to transmit one or more of a first message to the called device and a second message to the calling device.

Yet another example embodiment may include a non-transitory computer readable storage medium configured to store instructions that when executed cause a processor to perform one or more of identifying a failed call connection via a notification identifying a calling device and a called device stored in a carrier network, and responsive to identifying the notification, transmitting an invocation request to a virtual computing network comprising a plurality of virtual machines, selecting a virtual machine corresponding to the called device, selecting a virtual mobile device from among a plurality of virtual mobile devices operating on the virtual machine, initiating a virtual mobile device application associated with the virtual mobile device, and responsive to initiating the virtual mobile device application, transmitting one or more of a first message to the called device and a second message to the calling device.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to provide communication support for mobile devices operating outside of a carrier network. For example, when a call fails to connect a calling device with a called device (i.e., 'A' caller device, 'B' callee device), the carrier may not provide an alternative form of communication between the two devices. When a called device is overseas and/or is out of range of a mobile cellular network provided by its carrier network, alternative communication scenarios may be necessary to establish a communication trail of messages, transfers, calls, etc., between two communication devices. In general, when the carrier network cannot provide a call connection service that actively connects two endpoints, there are indicators which are created to identify when the alternative communication approach is appropriate. Such indicators can be used to trigger an alternative communication service/application.

Figure 1:
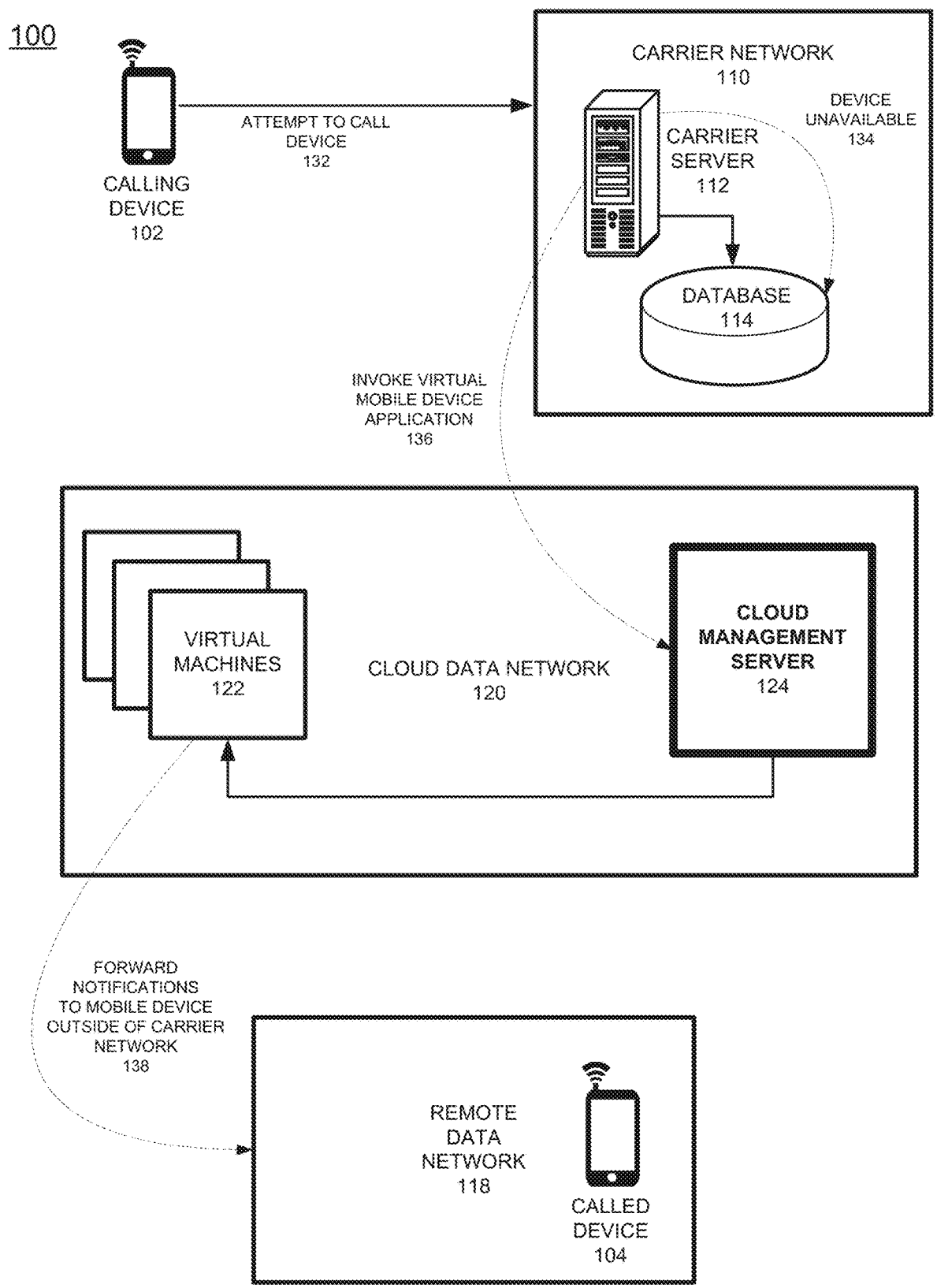
FIG. 1 illustrates an example network configuration for managing mobile device communications and alternative communications to a carrier network according to example embodiments.

FIG. 1 illustrates an example network configuration for managing mobile device communications and alternative communications to a carrier network according to example embodiments. Referring to FIG. 1, the configuration 100 provides three networks which are required to communicate in order for the alternative communication scenario to operate effectively. In the first network, the carrier network 110 includes mobile services, such as base stations and cellular network components (not shown), and a server, such as a home location register (HLR) that identifies the subscribers by their respective mobile device information and related hardware identifiers. For example, when a call is placed by a subscriber 102 that is attempting to call 132 another subscriber 104, which is not currently located in a communication range of the carrier network 110, then carrier server 112 will still attempt to connect the call by identifying the caller 102, the callee 104, determining the device 104 is unavailable 134 based on a database entry 114 of active subscribers vs. inactive subscribers, or other information stored in the database used to identify whether the callee 104 is available, unavailable, subscribed, unsubscribed, etc.

In the event that a call connection cannot be maintained between the calling device 102 and the called device 104, a log file and/or failed call parameter may be stored in the database 114 by the carrier server 112 to log the event failure. When the called device is off or is not identifiable by the carrier network via other carrier networks or other communication platforms, which are integrated with the carrier network 110, then the call will be identified as a failed call due to an inability to create a connection between the end devices. The result of a failed call will be logged via a failed call parameter stored in the database 114. The virtual computing network (cloud network 120), will audit the carrier call network for failed calls to identify whether a virtual mobile device can be identified and used to create a virtual call communication outside the carrier network in an attempt to provide communications between the two endpoint devices.

Once the virtual cloud network 120 is triggered 136 to identify a virtual mobile device that corresponds to the called device, the cloud management server 124 may process the trigger message communication sent from the carrier network 110 to the cloud network 120. The trigger/invocation message may include various parameters, such as a date/time of the failed call, the calling party, the called party, hardware information of the mobile devices, SIM card information, last known location, last known communication with the mobile network, whether the device is subscribed to out-of-carrier communication services, etc. The trigger/invocation message may include an identifier of the virtual machine 122, virtual device, and corresponding virtual mobile device assigned to the called mobile device. Once the correct virtual mobile device is identified, the virtual mobile device application may be executed, which will invoke certain actions to be performed, such as creating a message according to pre-stored communication medium preferences (e.g., SMS, e-mail, application specific communication preferences, etc.), pre-stored/default communication messages, etc., and sending the message to the mobile called device and/or the mobile calling device depending on the preferences stored in the virtual mobile device. Then, any notifications which are created can be sent created and sent 138 to a remote data network 188 where the mobile device is identified as being online.

Figure 2:
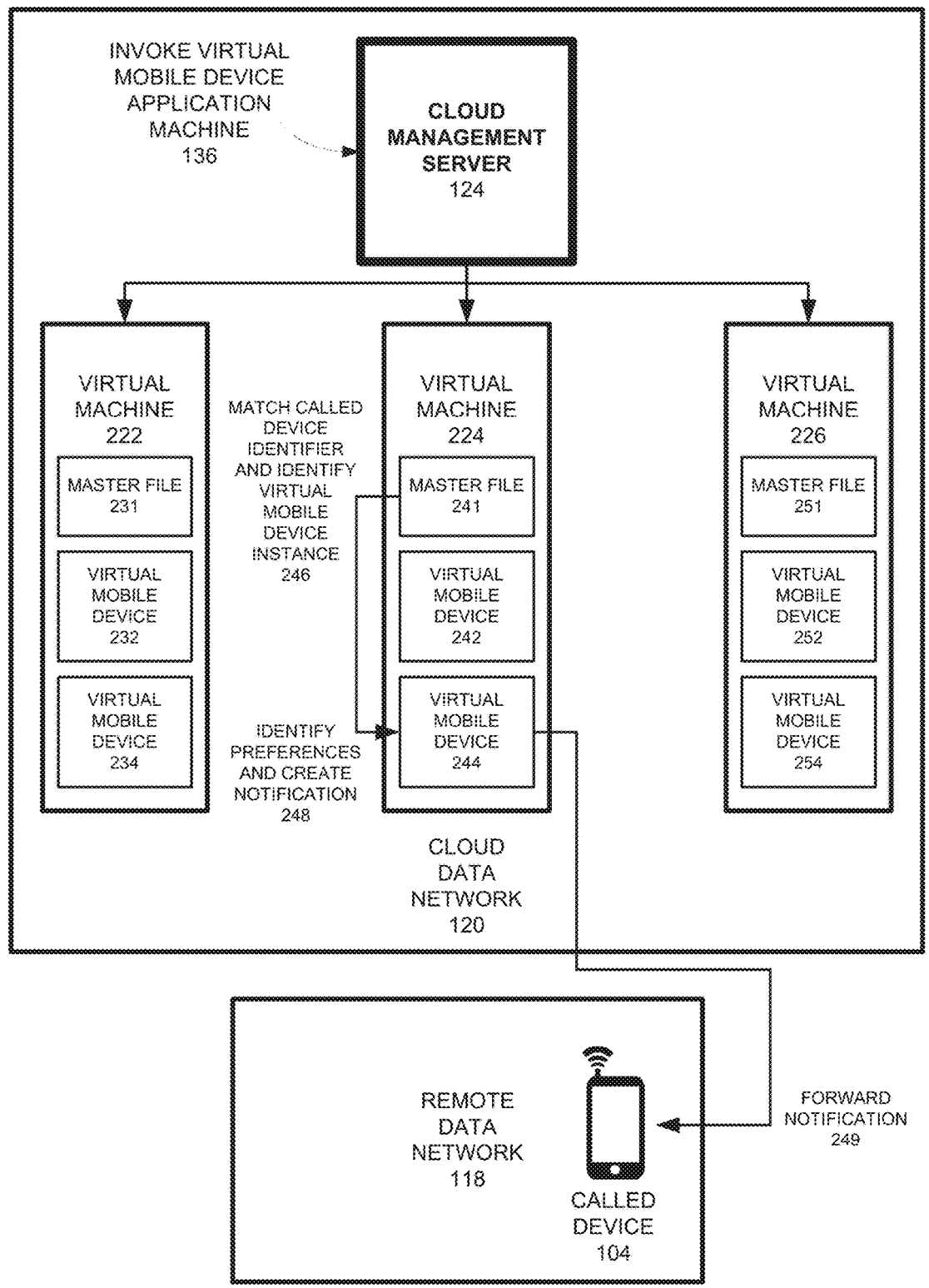
FIG. 2 illustrates a detailed example of the virtual network and virtual machines providing alternative communication scenarios according to example embodiments.

FIG. 2 illustrates a detailed example of the virtual network and virtual machines providing alternative communication scenarios according to example embodiments. Referring to FIG. 2, the configuration 200 provides additional details of the cloud computing network. The example provides that when the cloud management server 124 receives the invocation message 136, the various virtual machines 222-226, managed by the server 124, are audited to identify whether any of the virtual machines is hosting a virtual mobile device application, which may be operating inside a 'container', such as on a DOCKER platform. Each virtual machine 222-226 may have a corresponding master file 231-251. The master files may include information that identifies each of the virtual mobile devices 231-234, 241-244, and 251-254. The virtual mobile devices may each correspond to one actual mobile device, such as the called device. When the cloud management server 124 receives the invocation message including a mobile device identifier of a called device which did not connect to the calling device, the virtual mobile device corresponding to the mobile device identifier may be matched 246 by identifying the mobile device identifier included in the invocation message with the identifier stored in the virtual mobile device. After the correct virtual mobile device 244 is identified, mobile device preferences may be identified to create a message/notification 248, which can be forwarded 249 to the specified communication medium included in the preferences, such as an e-mail message, a SMS message, a specific chat application message, etc. The message may also have preferences, such as informing the called party of the missed call with certain parameters, such as the calling party, the time, date and other information regarding when the call was missed. A notification may be sent back to the calling party by default to specify that the virtual mobile device was initiated. This would include creating and sending notification to both the called party and the calling party devices.

Figure 3A:
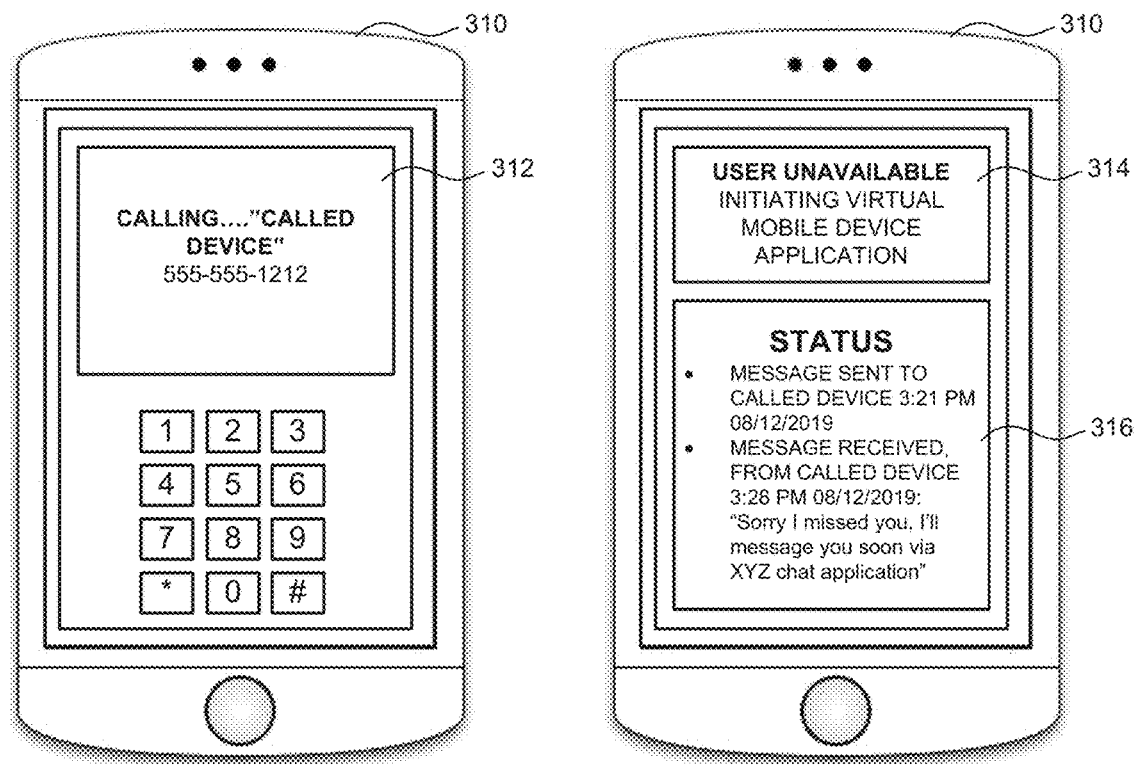
FIG. 3A illustrates an example user interface of a calling device using an alternative communication application according to example embodiments.

FIG. 3A illustrates an example user interface of a calling device using an alternative communication application according to example embodiments. Referring to FIG. 3A, the example 300 includes graphical user interfaces of the calling device 310 when the calling device is attempting to call the called device 312 and when the call fails to connect. The calling device may be notified by the virtual machine and virtual mobile device that the alternative communication options are being utilized 314. The display may also include details of the call log messages 316, such as when and what content was sent and received, to and from the mobile devices, once the call connection has failed. As may be observed, message notifications were sent to the called device and were received by the calling device.

Figure 3B:
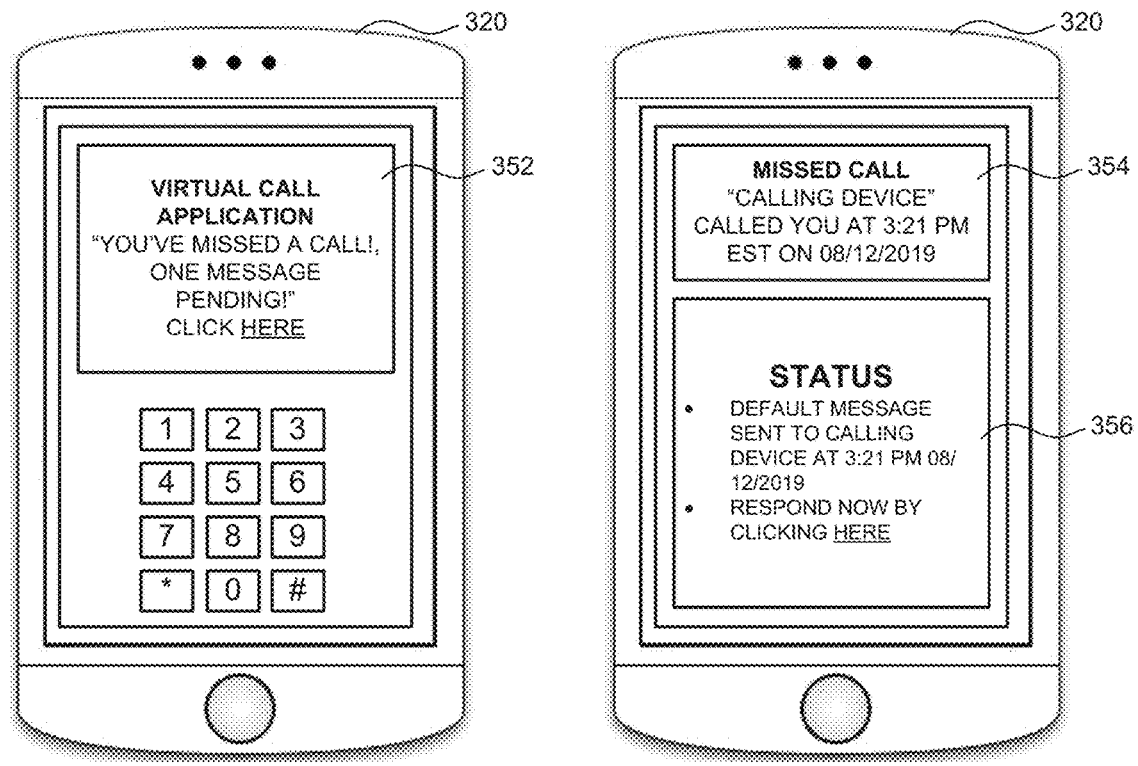
FIG. 3B illustrates an example user interface of a called device using an alternative communication application according to example embodiments.

FIG. 3B illustrates an example user interface of a called device using an alternative communication application according to example embodiments. Referring to FIG. 3B, the configuration 350 provides an example where the called device has received a notification regarding a missed call 352. The second display interface 354 includes details of the call, such as when and who attempted to call, message status information is also provided in another window with an option to communicate with the calling device 356.

Figure 4A:
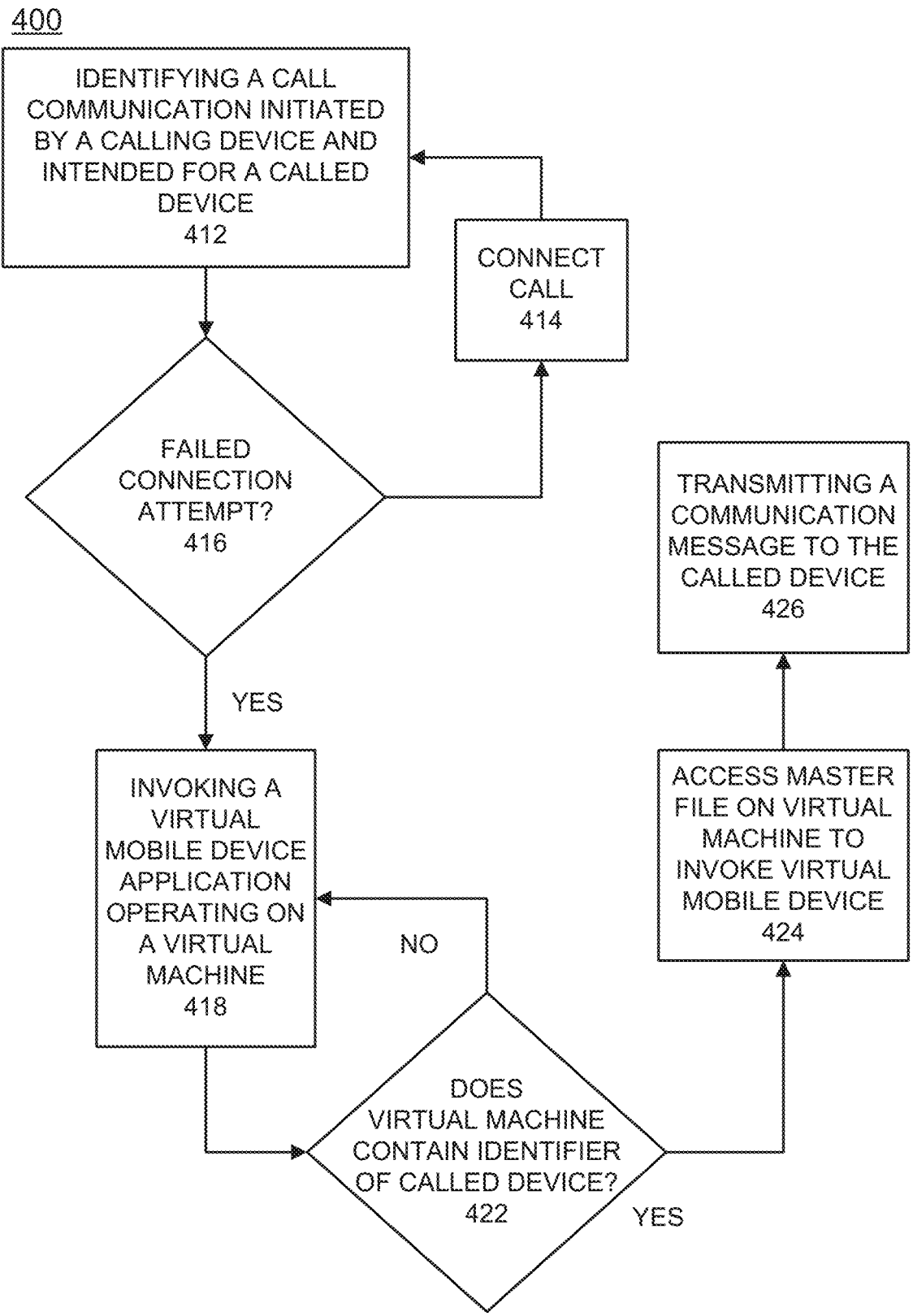
FIG. 4A illustrates an example logic flow diagram of an alternative communication scenario according to example embodiments.

FIG. 4A illustrates an example logic flow diagram of an alternative communication scenario according to example embodiments. Referring to FIG. 4A, the process 400 provides identifying a call communication initiated by a calling device and intended for a called device 412, the call may be identified at a carrier network server. If the call can be connected, then the call is connected 414 by the carrier network between the two devices. When the connection fails to connect 416, a virtual mobile device application is invoked 418 on a virtual machine operating in a cloud network. Once the virtual machine is identified that includes the identifier of the called device 422, then the master file of the virtual machine may be invoked 424 and used to identify the virtual mobile device application, which will cause a notification to be created and sent 426 to the called device.

In another example, the process may include creating the communication message via the virtual machine based on instructions in the master file, and the instructions include a communication message format and a communication message content to include in the communication message. Examples may include a default response or a response that indicates certain dynamic parameters, such as date, time, location, etc. In one example, the message may include a date a time that the called party associates with a response period, for example, the called party may engage in a WIFI connection each morning at 9 AM EST and may have that information sent to the calling party so the calling party knows when a response is likely to be sent and/or when the chat session may be live so the parties can exchange real time communications. The process may also include identifying one or more communication preferences in the master file, such that the one or more communication preferences are associated with a user profile of the called device. The one or more communication preferences may include one or more of a communication application to use when creating the communication message to the failed call connection, a communication message format to use for the communication message, and content to include in the communication message. The communication message format may include one or more of an electronic mail (e-mail) message, a short message service (SMS) message, and a chat communication application message format.

The process may also include selecting the virtual machine corresponding to the called device from among a plurality of virtual machines operating in a virtual computing network, and initiating the virtual mobile device application on the selected virtual machine, and selecting a virtual mobile device from among a plurality of virtual mobile devices operating on the virtual machine, and the virtual mobile device is selected based on an identifier stored in the master file which matches an identifier stored on the called device.

Figure 4B:
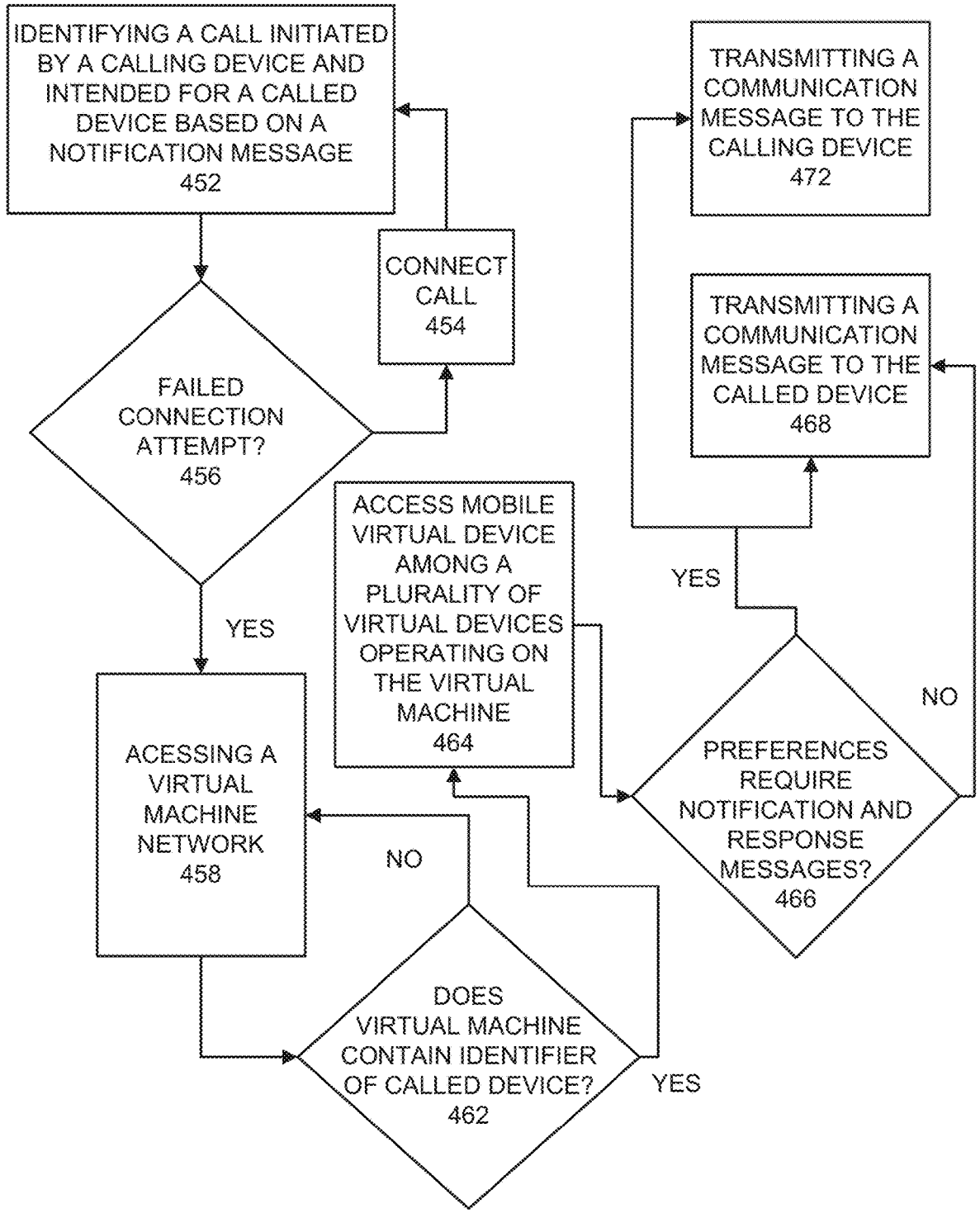
FIG. 4B illustrates another example logic flow diagram of an alternative communication scenario according to example embodiments.

FIG. 4B illustrates another example logic flow diagram of an alternative communication scenario according to example embodiments. Referring to FIG. 4B, the process 450 may include identifying a call connection attempt via a notification identifying a calling device and a called device stored in a carrier network 452, and responsive to identifying the notification, the carrier network server may attempt to connect the call 454. When there is a failed connection attempt 456, an invocation request may be created and sent to a virtual computing network having a plurality of virtual machines 458. The determination is then made as to whether a virtual machine has an identifier of a called device, if there is a match 462 between the mobile device and the virtual machine, and if so 464, then the correct virtual mobile device is accessed. The preferences are then identified and referenced to determine how to proceed with managing the alternative communication session. For example, the preferences 466 may dictate notifications be created and sent to the called device 468, the calling device 472 or both.

The process may also include creating the first message to notify the called device that a call attempt, sent from the calling device and destined for the called device, has failed to establish a call connection, and the first message includes a calling device identifier, a date and time of the call attempt and an option to send a notification to the calling device. The process may also include creating the second message to notify the calling device that a call attempt, sent from the calling device and destined for the called device, has failed to establish a call connection, and the second message may include a called device identifier, a date and time of the call attempt and an option to transmit a notification to the called device. The virtual mobile device is selected based on a called device identifier, corresponding to the called device, which is stored in the invocation request. Also, when initiating the virtual mobile device application associated with the virtual mobile device, a communication session is initiated between the calling device and the called device. The communication session includes a data network session to be established between the calling device and the called device based on an internet protocol address of the calling device and the called device. The process may also include forwarding a confirmation message to the virtual machine that the called device is available via a data communication network, and responsive to the virtual machine receiving the confirmation message, forwarding the first message to the called device.

Figure 5A:
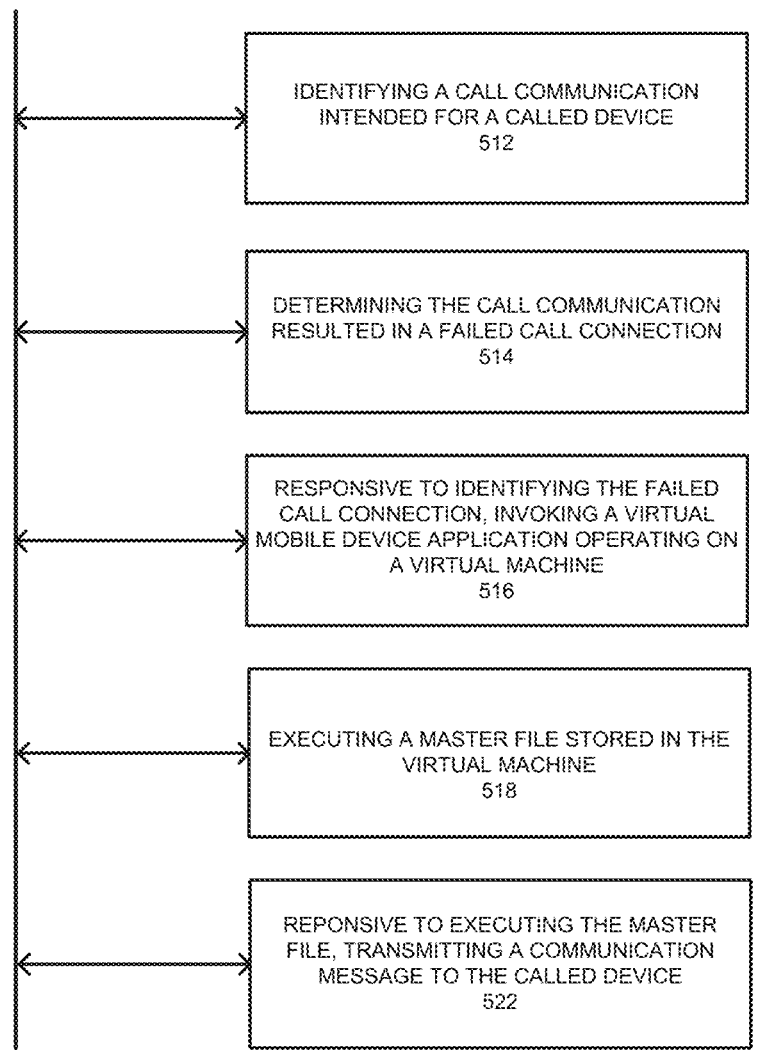
FIG. 5A illustrates an example flow diagram of an alternative communication scenario according to example embodiments.

FIG. 5A illustrates an example flow diagram of an alternative communication scenario according to example embodiments. Referring to FIG. 5A, the process 500 includes identifying a call communication initiated by a calling device and intended for a called device 512, determining the call communication resulted in a failed call connection 514, responsive to identifying the failed call connection, invoking a virtual mobile device application operating on a virtual machine 516, executing a master file stored in the virtual machine 518, responsive to executing the master file, transmitting a communication message to the called device 522.

Figure 5B:
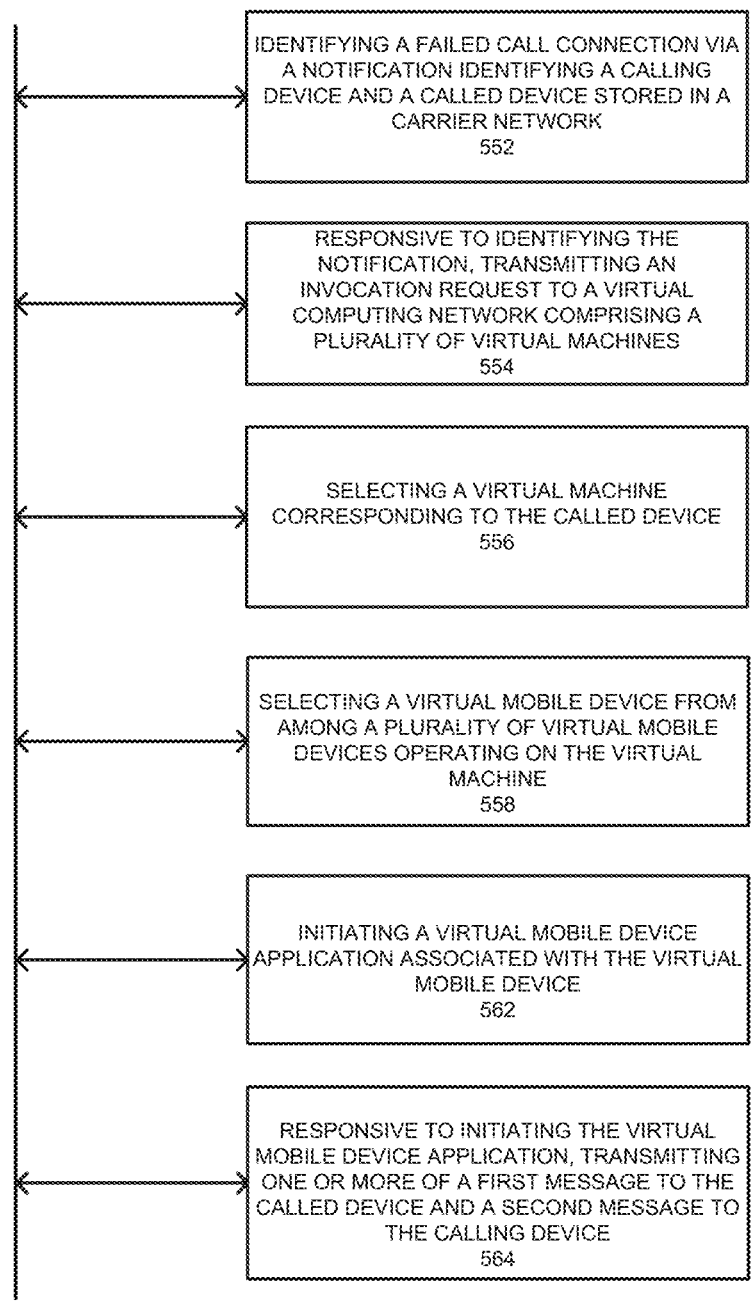
FIG. 5B illustrates an example flow diagram of another alternative communication scenario according to example embodiments.

FIG. 5B illustrates an example flow diagram of another alternative communication scenario according to example embodiments. Referring to FIG. 5B, the process 550 includes identifying a failed call connection via a notification identifying a calling device and a called device stored in a carrier network 552, responsive to identifying the notification, transmitting an invocation request to a virtual computing network comprising a plurality of virtual machines 554, selecting a virtual machine corresponding to the called device 556, selecting a virtual mobile device from among a plurality of virtual mobile devices operating on the virtual machine 558, initiating a virtual mobile device application associated with the virtual mobile device 562, and responsive to initiating the virtual mobile device application, transmitting one or more of a first message to the called device and a second message to the calling device 564.

Figure 6:
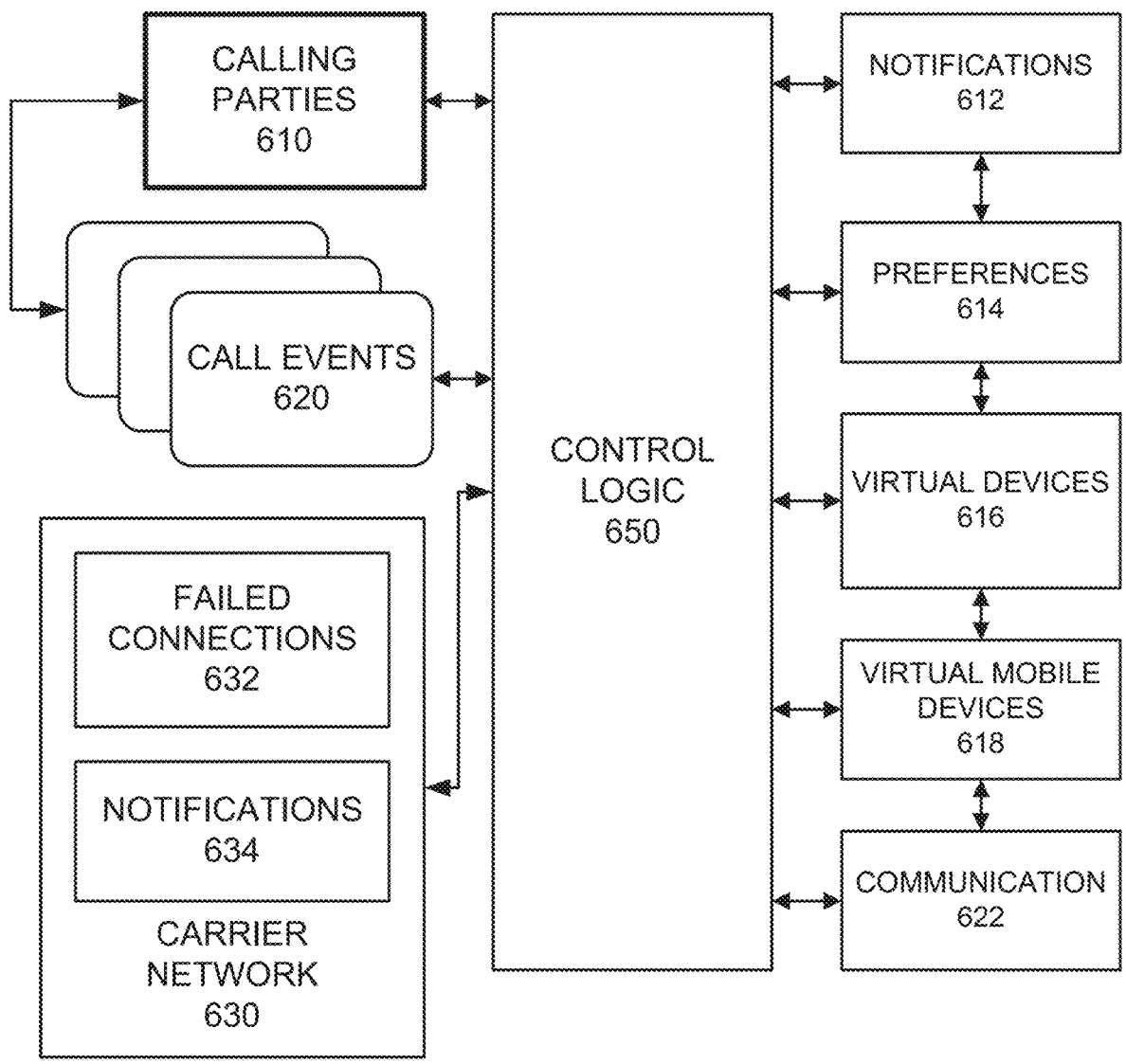
FIG. 6 illustrates an example logic process diagram of input and output parameters which are processed during an alternative communication scenario according to example embodiments.

FIG. 6 illustrates an example logic process diagram of input and output parameters which are processed during an alternative communication scenario according to example embodiments. Referring to FIG. 6, the example configuration 600 provides the logic processor 650 receiving various input parameters, such as calling parties 610 which are attempting to call certain call recipient parties via various call events 620. The carrier network 630 may be identifying failed call connections 632 and notifications 634 which occur from certain call attempts and logging such information. The outputs which are processed based on the various input parameters may include notifications 612, preferences 614, virtual devices 616, virtual mobile devices 618 and communication sessions 622.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example network element 700, which may represent any of the above-described network components of the other figures.

Figure 7:
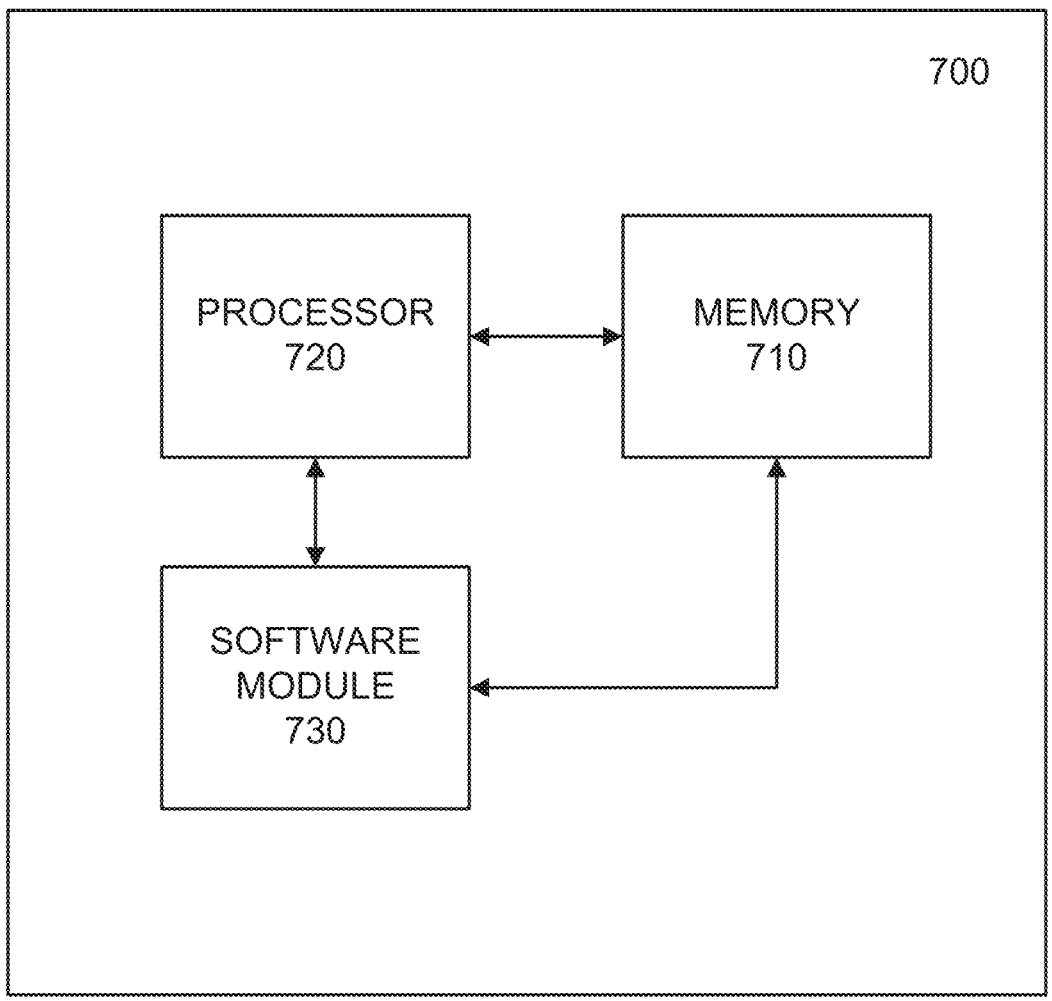
FIG. 7 illustrates an example network entity device configured to store instructions, software, and corresponding hardware for executing the same, according to example embodiments of the present application.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. The computer readable medium may be a non-transitory computer readable medium that includes tangible hardware components in addition to software stored in memory. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
    identifying a failed call connection via a notification identifying a calling device and a called device stored in a carrier network;
    responsive to identifying the failed call, transmitting an invocation request, including a called device identifier corresponding to the called device, to a virtual computing network comprising a plurality of virtual machines;
    selecting a virtual machine, of the plurality of virtual machines, corresponding to the called device;
    selecting a virtual mobile device from among a plurality of virtual mobile devices operating on the virtual machine based on the called device identifier;
    initiating a virtual mobile device application associated with the virtual mobile device;
    initiating a communication session between the calling device and the called device based on the initiating the virtual mobile device application; and
    transmitting at least one of a first message to the called device and a second message to the calling device.

2. The method of claim 1, comprising:
    notifying, by the first message, the called device that a call attempt, sent from the calling device and destined for the called device, failed to establish a call connection, wherein the first message comprises a calling device identifier, a date and time of the call attempt, and an option to send a notification to the calling device.

3. The method of claim 1, comprising:
    notifying, by the second message, the calling device that a call attempt, sent from the calling device and destined for the called device, has failed to establish a call connection, wherein the second message comprises a called device identifier, a date and time of the call attempt, and an option to transmit a notification to the called device.

4. The method of claim 1, wherein the initiating a communication session further comprises:
    initiating a communication session between the calling device and the called device based on an internet protocol address of the calling device and the called device.

5. The method of claim 1, comprising:
    forwarding a confirmation message to the virtual machine confirming that the called device is available via a data communication network; and
    responsive to the virtual machine receiving the confirmation message, forwarding the first message to the called device.

6. An apparatus comprising:
    a processor configured to:
    identify a failed call connection via a notification identifying a calling device and a called device stored in a carrier network; and
    a transmitter configured to:
    responsive to the failed notification being identified, transmit an invocation request, including a called device identifier corresponding to the called device, to a virtual computing network comprising a plurality of virtual machines;
    wherein the processor is further configured to:
        select a virtual machine, of the plurality of virtual machines, corresponding to the called device,
        select a virtual mobile device from among a plurality of virtual mobile devices operating on the virtual machine based on the called device identifier, initiate a virtual mobile device application associated with the virtual mobile device, and initiate a communication session between the calling device and the called device based on the initiating the virtual mobile device application; and wherein the transmitter is further configured to:

transmit at least one of a first message to the called device and a second message to the calling device.

7. The apparatus of claim 6, wherein the processor is further configured to:

notify, by the first message the called device that a call attempt, sent from the calling device and destined for the called device, has failed to establish a call connection, wherein the first message comprises a calling device identifier, a date and time of the call attempt and an option to send a notification to the calling device.

8. The apparatus of claim 6, wherein the processor is further configured to:

notify, by the second message to notify the calling device that a call attempt, sent from the calling device and destined for the called device, has failed to establish a call connection, wherein the second message comprises a called device identifier, a date and time of the call attempt and an option to transmit a notification to the called device.

9. The apparatus of claim 6, wherein, when the processor is configured to initiate a communication session, the processor is further configured to:

initiate a communication session to between the calling device and the called device based on an internet protocol address of the calling device and the called device.

10. The apparatus of claim 6, wherein the processor is further configured to:

forward a confirmation message to the virtual machine that the called device is available via a data communication network; and responsive to the virtual machine having received the confirmation message, forward the first message to the called device.

11. A non-transitory computer readable storage medium configured to store instructions that when executed by a processor cause the processor to perform:

identifying a failed call connection via a notification identifying a calling device and a called device stored in a carrier network;

responsive to identifying the failed call, transmitting an invocation request, including a called device identifier corresponding to the called device, to a virtual computing network comprising a plurality of virtual machines;

selecting a virtual machine, of the plurality of virtual machines, corresponding to the called device;

selecting a virtual mobile device from among a plurality of virtual mobile devices operating on the virtual machine based on the called device identifier;

initiating a virtual mobile device application associated with the virtual mobile device;

initiating a communication session between the calling device and the called device based on the initiating the virtual mobile device application; and transmitting at least one of a first message to the called device and a second message to the calling device.

12. The non-transitory computer readable storage medium of claim 11, wherein the instructions further cause the processor to perform:

notifying, by the first message, the called device that a call attempt, sent from the calling device and destined for the called device, failed to establish a call connection, wherein the first message comprises a calling device identifier, a date and time of the call attempt, and an option to send a notification to the calling device.

13. The non-transitory computer readable storage medium of claim 11, wherein the instructions further cause the processor to perform:

notifying, by the second message, the calling device that a call attempt, sent from the calling device and destined for the called device, has failed to establish a call connection, wherein the second message comprises a called device identifier, a date and time of the call attempt, and an option to transmit a notification to the called device.

14. The non-transitory computer readable storage medium of claim 11, wherein, when the instructions cause the processor to initiate a communication session, the instructions further cause the processor to:

initiate a communication session between the calling device and the called device based on an internet protocol address of the calling device and the called device.

* * * * *